(12) United States Patent
Westerhoff et al.

(10) Patent No.: US 12,429,559 B2
(45) Date of Patent: Sep. 30, 2025

(54) RADAR-BASED ESTIMATION OF THE HEIGHT OF AN OBJECT

(71) Applicant: Aptiv Technologies AG, Schaffhausen (CH)

(72) Inventors: Jens Westerhoff, Bochum (DE); Shan Zhang, Yorba Linda, CA (US); Yihang Zhang, Calabasas, CA (US); Narbik Manukian, Los Angeles, CA (US)

(73) Assignee: Aptiv Technologies AG, Schaffhausen (CH)

( * ) Notice: Subject to any disclaimer, the term of this patent is extended or adjusted under 35 U.S.C. 154(b) by 291 days.

(21) Appl. No.: 18/060,088

(22) Filed: Nov. 30, 2022

(65) Prior Publication Data

US 2023/0176190 A1   Jun. 8, 2023

(30) Foreign Application Priority Data

Dec. 3, 2021   (EP) .................................... 21212231

(51) Int. Cl.
| | |
|---|---|
| G01S 7/48 | (2006.01) |
| G01S 13/42 | (2006.01) |
| G01S 13/86 | (2006.01) |
| G01S 13/931 | (2020.01) |
| G01S 17/931 | (2020.01) |

(52) U.S. Cl.
CPC ............ *G01S 7/4802* (2013.01); *G01S 13/42* (2013.01); *G01S 13/865* (2013.01); *G01S 13/931* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 7,639,171 | B2 | 12/2009 | Alland et al. |
| 9,140,788 | B2 | 9/2015 | Kuehnle |
| 9,470,777 | B2 | 10/2016 | Arage |
| 10,315,578 | B2 | 6/2019 | Kim et al. |

(Continued)

FOREIGN PATENT DOCUMENTS

| | | |
|---|---|---|
| CN | 112241007 | 1/2021 |
| CN | 212604823 | 2/2021 |

(Continued)

OTHER PUBLICATIONS

"Extended European Search Report", EP Application No. 21212231. 1, May 19, 2022, 8 pages.

(Continued)

*Primary Examiner* — Bernarr E Gregory
(74) *Attorney, Agent, or Firm* — Harness, Dickey & Pierce, P.L.C.

(57) ABSTRACT

This document describes systems and techniques for determining a height of an object in a surrounding of a vehicle. In a first aspect, the systems and techniques include acquiring radar data for each of a plurality of vertically distributed antenna elements of a radar antenna. In additional aspects, the systems and techniques include estimating an elevation spectrum from the acquired radar data, extracting one or more features representative of the shape of the estimated elevation spectrum, and determining the height of the object using the extracted one or more features.

20 Claims, 7 Drawing Sheets

(56) References Cited

U.S. PATENT DOCUMENTS

| | | |
|---|---|---|
| 10,551,501 B1 | 2/2020 | Lachapelle |
| 10,649,461 B2 | 5/2020 | Han et al. |
| 10,962,628 B1 | 3/2021 | Laifenfeld et al. |
| 2016/0033632 A1* | 2/2016 | Searcy .................. G01S 13/931 |
| | | 342/153 |
| 2016/0335923 A1 | 11/2016 | Hofmann |
| 2017/0316333 A1 | 11/2017 | Levinson et al. |
| 2018/0032822 A1 | 2/2018 | Frank et al. |
| 2018/0066957 A1 | 3/2018 | Stroila et al. |
| 2018/0188060 A1 | 7/2018 | Wheeler et al. |
| 2018/0335307 A1 | 11/2018 | Chen et al. |
| 2020/0064483 A1 | 2/2020 | Li et al. |
| 2020/0110817 A1 | 4/2020 | Viswanathan |
| 2020/0209867 A1 | 7/2020 | Valois et al. |
| 2020/0225337 A1 | 7/2020 | Kishigami |
| 2020/0284907 A1 | 9/2020 | Gupta |
| 2020/0346581 A1 | 11/2020 | Lawson et al. |
| 2021/0018592 A1 | 1/2021 | Laghezza et al. |
| 2021/0033404 A1 | 2/2021 | Lawlor et al. |
| 2021/0080544 A1 | 3/2021 | Schnitzer et al. |
| 2021/0110217 A1 | 4/2021 | Gunel |
| 2021/0157321 A1 | 5/2021 | Wang et al. |
| 2021/0390291 A1 | 12/2021 | Sameer |
| 2023/0194666 A1 | 6/2023 | Rainko et al. |
| 2023/0194711 A1 | 6/2023 | Rainko et al. |
| 2023/0236030 A1 | 7/2023 | Nunn et al. |

FOREIGN PATENT DOCUMENTS

| | | | | |
|---|---|---|---|---|
| CN | 112986951 | | 6/2021 | |
| DE | 102018203584 | | 9/2019 | |
| DE | 112019000049 | | 1/2020 | |
| EP | 3279690 A1 | * | 2/2018 | ........... G01S 13/931 |
| EP | 3454079 | | 3/2019 | |
| EP | 3767333 | | 1/2021 | |
| EP | 3785995 | | 3/2021 | |
| EP | 3792656 A1 | * | 3/2021 | ........... G01S 13/931 |
| WO | 2013056064 | | 4/2013 | |
| WO | 2020082363 | | 4/2020 | |
| WO | 2021072380 | | 4/2021 | |
| WO | 2021154155 | | 8/2021 | |

OTHER PUBLICATIONS

"Extended European Search Report", EP Application No. 21215901.6, Jun. 9, 2022, 8 pages.

"Extended European Search Report", EP Application No. 21215899.2, Sep. 23, 2022, 11 pages.

"Extended European Search Report", EP Application No. 23152622.9, Jun. 27, 2023, 9 pages.

"Search Report", GB Application No. 2201078.9, Jul. 11, 2022, 5 pages.

Manjunath, et al., "Radar Based Object Detection and Tracking for Autonomous Driving", 2018 IEEE MTT-S International Conference on Microwaves for Intelligent Mobility, Aug. 2018, 4 pages.

* cited by examiner

RADAR-BASED ESTIMATION OF THE HEIGHT OF AN OBJECT

INCORPORATION BY REFERENCE

This application claims priority to European Patent Application Number EP21212231.1, filed Dec. 3, 2021, the disclosure of which is incorporated by reference in its entirety.

BACKGROUND

Determining that the area surrounding a vehicle is free of any obstacles with which the vehicle may collide, is a crucial capability of drive automation.

Driver assistance systems, which render possible semi-autonomous or autonomous driving, must be able to access accurate information about the driving environment of a vehicle. In particular, in the vehicle surroundings, driver assistance systems should distinguish between passable, drivable, or open areas, which may be referred to as free space, and impassable areas. An impassable area may be, for example, an area in which there is an obstacle. An obstacle may, for example, be an object that prevents or hinders driving of the vehicle.

Modern vehicles typically have, among other sensors such as ultrasound sensors, camera sensors, and light ranging and detection (LIDAR) sensors, one or more radar sensors which can be used to monitor and acquire sensor data of the environment, that is the surrounding, of the vehicle and to detect objects in the surrounding.

However, in order for driver assistance systems to provide useful assistance, it is beneficial that detected objects in the vehicle's surrounding can be appropriately determined as obstacles so that the driver assistance provided may be adapted accordingly. That is, it is beneficial that a driver assistance system can determine whether a detected object actually prevents or hinders driving so that the driver assistance system only reacts to genuine obstacles.

In order to decide on the over-drivability of an object, it is beneficial to have an accurate estimation of the height of the object.

Modern vehicles are generally provided with a front-looking radar sensor. Such a radar sensor is mounted on the vehicle and can be used to detect an object in path of the vehicle. Usually, the output of such a radar sensor consists of detections which are a point-like presentation of the reflection centers in the environment.

A radar antenna of such a radar sensor may have multiple antenna elements. If the radar antenna has multiple antenna elements distributed in vertical direction. By way of example, these may also be referred to as receiving antenna elements. The multiple antenna elements distributed in vertical direction may be in addition to the antenna elements distributed horizontally. As such, it is possible to obtain detections which are separated in elevation, i.e., vertical height.

In general, a standard process of obtaining detections from the output of the antenna elements may consist of the following:

1. Collecting the received complex numbers from the antenna elements to form a vector, hereinafter called "beam vector";
2. Estimating an elevation spectrum, for example a power spectrum, based on the beam vector;
3. Searching for one or multiple peaks within in the elevation spectrum; and
4. Determining the peak as the elevation angle of the detected object.

Using the detected elevation angle, a height of the detected object relative to the road surface may be determined by transforming the elevation angle of the detection into a height value by considering the mounting height relative to the road surface of the radar sensor on the vehicle, the elevation angle of the radar mounting relative the road surface, and the dynamic pitch angle of the radar sensor relative to the road surface. Dynamic pitch angle refers to the change of the angle between the radar coordinate system and a world coordinate system due to road irregularities like bumps, holes, and acceleration/braking maneuvers while driving. By way of example, a suitable world coordinate system may have its origin at the road surface.

There are a number of drawbacks with such standard processes for determining the height of a detected object.

Firstly, such standard processes are highly dependent on the capability of the radar sensor to resolve scatters in elevation which is usually quite low for automotive radar sensors. For example, the ability of automotive radar sensors to resolve scatters in elevation is generally much lower than their ability to resolve scatters in azimuth, i.e., in the horizontal direction.

For instance, when using typical automotive radar sensors, a case may arise where a reflection point at the bottom of the object and a reflection point at the top of the object cannot be separated due to the low resolution of the radar sensor with respect to elevation. In this case, the peak in the spectrum would be detected as being located somewhere in between these reflection points. This leads to an underestimation of the height of the object.

By way of further example, a case may arise were a strong reflection point and a weak reflection point are detected on an object. When using a standard process as described above, the weak reflection point may not be reported as a peak. even though the weak reflection point may be the more important one, for example the reflection point on the top of the object needed to estimate the height of the object.

Secondly, such standard processes are highly dependent on the availability of accurate data about the elevation angle of the radar sensor mounting and the dynamic pitch angle. Such information may not always be available to the driver assistance system or may be inaccurate if the mounting of the radar sensor has been adjusted in any way, e.g., due to damage or repairs, or the vehicle does not have reliable means of sensing the dynamic pitch angle.

Thirdly, during such standard processes of detection generation, useful information is lost as only the peak in the estimated elevation spectrum is considered.

Therefore, it is an object of the aspects disclosed herein to address one or more of the above-identified drawbacks.

SUMMARY

The present disclosure relates to a computer-implemented method, a computer program, and a device for determining a height of an object in a surrounding of a vehicle. The device may be provided in a vehicle so that the vehicle can determine the height of an object in its surrounding.

There is disclosed herein, in accordance with embodiments of a first aspect of the present disclosure, a computer-implemented method for determining a height of an object in a surrounding of a vehicle. The method comprises acquiring radar data in respect of each of a plurality of vertically distributed antenna elements of a radar antenna and estimating an elevation spectrum from the acquired radar data. The method further comprises extracting one or more features representative of the shape of the estimated elevation spectrum and determining the height of the object using the extracted one or more features.

The aspects disclosed herein determine the height of an object using one or more features representative of the shape of an estimated elevation spectrum, extracted from said elevation spectrum.

Information lost during the standard detection generation processes discussed above includes the spectrum itself. By determining the height of an object using one or more features representative of the shape of the estimated elevation spectrum, rather than a position of the peak of the elevation spectrum only, the aspects disclosed herein allow this information to be exploited to obtain additional discriminative power in order to more accurately and reliably determine the height of a detected object.

Furthermore, the aspects disclosed herein exploit the shape of the elevation spectrum, rather than the absolute position of one or more peaks in the elevation spectrum in order to determine the height of the object. This offers a number of further benefits:

1. The shape of the elevation spectrum represents the overall reflection behaviour of a detected object. As such, the first problem discussed above may be mitigated.
2. By neglecting the absolute position of a peak(s) within the elevation spectrum, the aspects disclosed herein are invariant with respect to elevation angle of the radar sensor mounting and, more importantly, invariant with respect to the dynamic pitch angle.

The radar data may comprise, for each of the plurality of antenna elements, a complex number indicative of the phase and magnitude of a return signal received by that antenna element.

The elevation spectrum may comprise an estimation of the phase or magnitude of a return signal versus elevation angle.

The extracted one or more features comprise an angular area of the elevation spectrum at a given level of magnitude.

The height of the object may be determined as a height value that minimizes a difference between the angular area at the given level of magnitude relative to a highest peak of the elevation spectrum and an estimated angular area of the object.

The method according to the first aspect may further comprise determining a distance from the radar antenna to the object based on the radar data.

The estimated angular area of the object may be estimated using the measured distance from the radar antenna to the object, a mounting height of the radar antenna relative to the ground, and the height value.

Extracting the one or more features may comprise fitting a distribution of the elevation spectrum and extracting, as the one or more features, one or more parameters of the fitted distribution.

The method according to the first aspect may further comprise determining an updated height of the object based on radar data acquired for each of one or more time steps as the vehicle moves.

The height of the object may be determined by inputting the extracted one or more features to a machine-learning algorithm.

The machine learning algorithm may be trained to determine a relationship between the shape of an elevation spectrum and a height of an object.

The one or more features representative of the shape of the estimated elevation spectrum may be extracted for radar data acquired for each of one or more time steps as the vehicle moves. In this case, the height of the object may be determined by inputting, to the machine learning algorithm, the one or more features extracted for each of the one or more time steps.

The extracted one or more features comprise at least one of a width of the elevation spectrum at one or more levels of magnitude relative to a highest peak of the elevation spectrum; and one or more parameters of a distribution fitted to the elevation spectrum.

A position of a peak of the elevation spectrum may also be input to the machine learning algorithm.

Extracting the one or more features may comprise using a machine learning-based encoder technique.

The method according to the first aspect may further comprise determining, based on the determined height of the object, whether the vehicle is capable of driving over the object.

The method according to the first aspect may further comprise determining, in a case where the vehicle is not capable of driving over the object, whether to activate automatic emergency breaking (AEB).

The method according to the first aspect may further comprise determining, in a case where the vehicle is not capable of driving over the object, whether to modify a path of the vehicle for autonomous driving.

There is disclosed herein, in accordance with embodiments of a second aspect of the present disclosure, a computer program comprising instructions which, when the program is executed by a computer, cause the computer to carry out the method according to the first aspect.

There is disclosed herein, in accordance with embodiments of a third aspect of the present disclosure, a device for determining a height of an object in a surrounding of a vehicle. The device comprises an acquiring unit configured to acquire radar data in respect of each of a plurality of vertically distributed antenna elements of a radar antenna. The device further comprises an estimating unit configured to estimate an elevation spectrum from the acquired radar data. The device further comprises an extracting unit configured to extract one or more features representative of the shape of the estimated elevation spectrum. The device further comprises a determining unit configured to determine the height of the object using the extracted one or more features.

The device according to the third aspect may further comprise one or more radar antennas, each of the one or more radar antennas comprising a plurality of vertically distributed antenna elements.

The one or more radar antennas may be configured to emit a signal and detect a return signal.

The acquiring unit may be configured to acquire the acquired sensor data based on the return signal.

There is disclosed herein, in accordance with a fourth aspect herein, a vehicle having one or more devices according to the third aspect.

BRIEF DESCRIPTION OF THE DRAWINGS

Embodiments of the disclosure will now be explained in detail, by way of non-limiting examples only, with reference to the accompanying figures, described below. Like reference numerals appearing in different ones of the Figures can denote identical or functionally similar elements, unless indicated otherwise.

DETAILED DESCRIPTION

Figure 1:
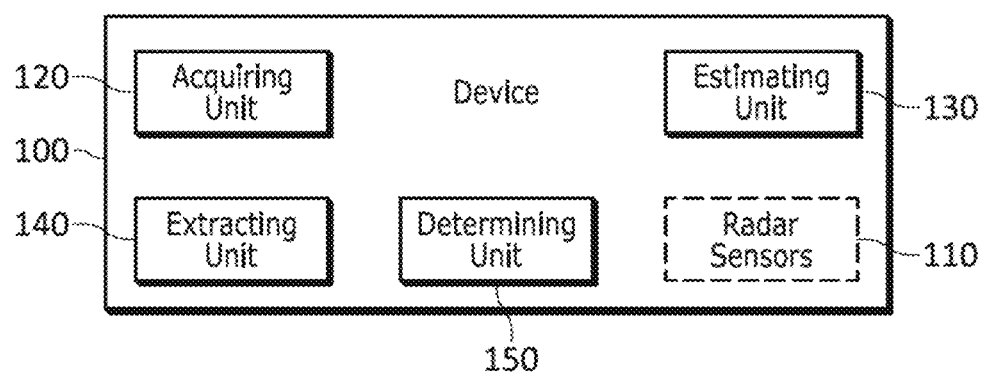
FIG. 1 is a schematic illustration of a device for determining a height of an object in a surrounding of a vehicle, according to an example embodiment herein.

As discussed above, in order for driver assistance systems to provide useful assistance, detected objects in the vehicle's surrounding can be appropriately determined as obstacles. That is, a driver assistance system can determine whether a detected object actually prevents or hinders driving so that the driver assistance system only reacts to genuine obstacles.

In order to accurately determined obstacles, the driver assistance system may determine if a detected object is in the path of the vehicle. Such an object may be considered an obstacle. Such a determination will be dependent on, for example, the location of the object relative to the vehicle, the direction of travel of the vehicle, its velocity, its acceleration, etc. which may be obtainable from onboard sensors of the vehicle.

Furthermore, it is advantageous to provide the driver assistance system with means for determining if the vehicle can (safely) drive over the detected object or not (that is, the over-drivability of an object). A detected object is considered to be over-drivable if the vehicle can safely drive over this object.

More specifically, the driver assistance may determine that the vehicle can safely drive over an object where the height of the object relative to the road surface does not exceed a particular threshold value. The threshold value may be dependent on the speed of the vehicle as it approaches the object (obtainable from, for example, onboard sensors of the vehicle) and also depends on known, prestored characteristics of the vehicle, such as wheel size and road height (ground clearance).

Based on the determination of over-drivability, the driver assistance system may take various actions to assist the driver of the vehicle to react to the obstacle. For example, automatic emergency braking (AEB) may be activated if it is not possible to drive over the object.

In a case where the driver assistance system has advanced driver-assistance system (ADAS) functionality or autonomous driving functionality, the driver assistance system may allow the driver of a host vehicle (i.e., the vehicle to be controlled) to hand over the control of both acceleration and steering of the vehicle to an autonomous driving system, which may be provided with, for example, a target velocity and headway time or more detailed information so as to follow an intended route. In this case, the intended route (path) of the vehicle may be modified, if it is not possible to drive over the object, or it may remain as it is if the object is over-drivable.

That is, the driver assistance system may determine that a detected object, even where the object is in the path of the vehicle, is not an actual obstacle if that object is over-drivable.

The present disclosure provides in accordance with exemplary embodiments disclosed herein, a computer-implemented method, a computer program, and a device for determining a height of a detected object in a more reliable and accurate manner. This may in turn, for example, facilitate determination of whether a detected object is over-drivable or it hinders the path of the vehicle, and accordingly adapting, if required, the driving assistance functionality of the vehicle.

Embodiments of the present disclosure will now be described in reference to the enclosed figures. In the following detailed description, numerous specific details are set forth. These specific details are only to provide a thorough understanding of the various described embodiments. Further, although the terms first, second, etc. may be used to describe various elements, these elements should not be limited by these terms. These terms are only used to distinguish one element from another.

Figure 2A:
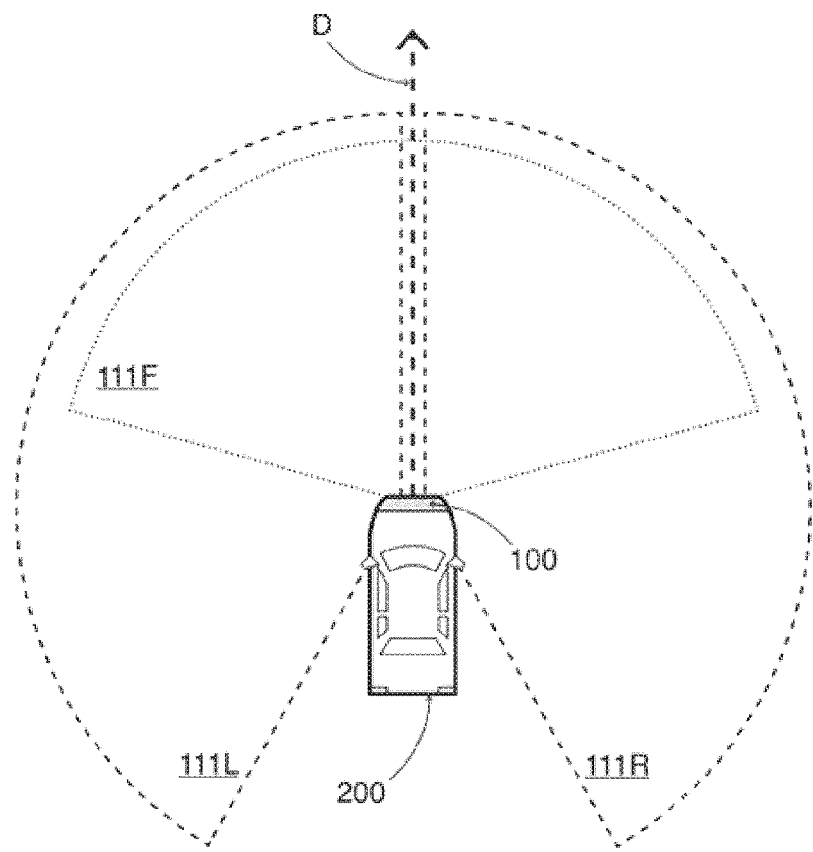
FIGS. 2A and 2B are schematic illustrations of the plurality of detection areas of the device of FIG. 1.

FIG. 1 shows a device 100 according to an example embodiment of the present disclosure determining a height of an object in a surrounding of a vehicle 200 as shown in FIG. 2. The device 100 may be provided in the vehicle 200 and, preferably, may be mounted on the vehicle 200 facing a driving direction D of the vehicle 200. The skilled person understands that it is not required that the device 100 faces the driving direction; the device 100 can also face to a side direction or to a rear direction. The device 100 may be a radar sensor, a radar module, part of a radar system, or the like. The vehicle 200 may also have more than one of such devices 100.

The device 100 of FIG. 1 may be provided as part of or interact with a driver assistance system of the vehicle 200. The driver assistance system of the vehicle 200 may include advanced driver-assistance system (ADAS) functionality or autonomous driving functionality.

A vehicle 200 may be any land vehicle that is moved by machine power. Such a vehicle 200 may also be tied to railroad tracks, floating, diving or airborne. The figures exemplify this vehicle 200 as a car, with which the device 100 is provided. The present disclosure is, however, not limited thereto. Hence, the device 100 may also be mounted to e.g., a lorry, a truck, a farming vehicle, a motorbike, a train, a bus, an aircraft, a drone, a boat, a ship, a robot, or the like.

Figure 2B:
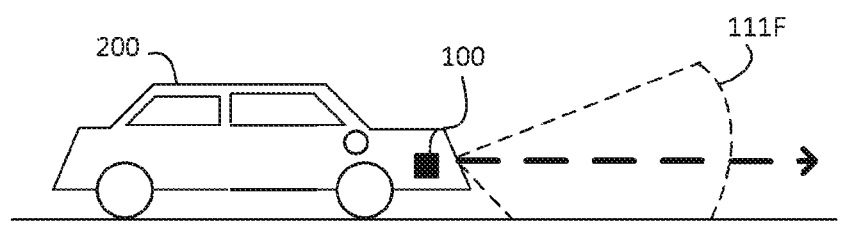

The device 100 may have a plurality of detection areas. For example the device 100 may be orientated such that it has a forward detection area 111F, a left detection area 111L and/or a right detection area 111R as shown in the plan view of FIG. 2A. As shown in FIG. 2B, each of the plurality of detection areas may also extend in elevation which illustrates, by way of example, the vertical extent of the forward detection area. In addition, an extension of the detection areas, such as, for example, a near field detection area or a far field detection area, may differ.

By way of non-limiting example, an object may be considered to be in the surrounding of the vehicle 200 at least when it is located within one or more of the plurality of detection areas of the device 100.

As illustrated in FIG. 1, the device 100 includes an acquiring unit 120, an estimating unit 130, an extracting unit 140, and a determining unit 150. In addition, the device 100 may optionally include one or more radar sensors 110, but the one or more radar sensors may also be provided separate to the device 100.

The following further illustrates an embodiment in which the one or more radar sensors 110 include on or more radar antennas.

Herein, the one or more antennas may be configured to emit radar signals, preferably modulated radar signals, e.g., a Chirp-Signal. A signal may be acquired or detected at the one or more antennas and is generally referred to as return signal below. Herein, the return signal(s) may result from a reflection of the emitted radar signal(s) on an obstacle or object in the environment or surrounding of the vehicle. By way of example, the object may be a speed bump, a pedestrian, another vehicle such as a bus or car, or the like. However, the return signal(s) may also include a noise signal resulting from noise which may be caused by other electronic devices, other sources of electromagnetic interference, thermal noise, and the like.

The one or more antennas may be provided individually or as an array of antennas, wherein at least one antenna of the one or more antennas of the radar sensor(s) 110 emits the radar signal(s), and at least one antenna of the one or more antennas detects the return signal(s). The detected or acquired return signal(s) represents a variation of an amplitude/energy of an electromagnetic field over time.

Each of the one or more radar antennas include a plurality of vertically distributed antenna elements. That is, the antenna elements are arranged or arrayed in the vertical direction, such that the particular antenna element which receives a return signal is indicative of the elevation angle of the reflection point from which said return signal originated.

The acquiring unit 120 is configured to acquire radar data in respect of each of the plurality of vertically distributed antenna elements of a radar antenna. By way of example, radar data may be considered sensor-based data. In cases where the radar sensor(s) 110 includes more than one radar antenna, the acquiring unit 120 may be configured to acquire the radar data regarding each of the one or more radar antennas of the radar sensor(s) 110.

The acquiring unit 120 may acquire the return signal, detected at each of the plurality of antenna elements of the radar antenna, and may apply an analogue-to-digital (A/D) conversion thereto.

The radar data may, as in the present example embodiment, comprise, for each of the plurality of antenna elements, a complex number indicative of the phase and magnitude of a return signal received by that antenna element. By way of more specific example, the return signal received at a given antenna element at a given time may be expressed as a complex number in the form of $z=Ae^{i\phi}$ where A is the magnitude, for example amplitude or energy, of the electromagnetic field and $\phi$ is the phase of the electromagnetic field at that time.

Optionally, the acquired radar data may, as in the present example embodiment, also include range data and radial range rate (also referred to as Doppler) data for use by other functions of the driver assistance system such as determining a position of an object relative to the vehicle or a speed of an object relative to the vehicle.

The acquiring unit 120 may, as in the present example embodiment, convert a delay between emitting the radar signal(s) and detecting the return signal(s) into the range data. The delay, and thereby the range data, may be acquired by correlating the return signal(s) with the emitted radar signal(s). The acquiring unit 120 may compute, from a frequency shift or a phase shift of the detected return signal(s) compared to the emitted radar signal(s), a Doppler shift or a range rate shift as the range rate data. The frequency shift or the phase shift, and thereby the radial range rate data, may be acquired by frequency-transforming the return signal(s) and comparing its frequency spectrum with the frequency of the emitted radar signal(s). The determination of range data and radial range rate (Doppler) data from the detected return signal(s) at the one or more antennas may, for example, be performed as described in U.S. Pat. No. 7,639,171 or U.S. Pat. No. 9,470,777 or EP 3 454 079.

Any value in the radar data equal to or below a noise-based threshold is indicative of free space, and any such value may therefore be used as a direct determination of free space around the device 100 in vehicle 200.

The estimating unit 130 of FIG. 1 is configured to estimate an elevation spectrum from the acquired radar data.

The extracting unit 140 of FIG. 1 is configured to extract one or more features representative of the shape of the estimated elevation spectrum.

The determining unit 150 of FIG. 1 is configured to determine the height of the object using the extracted one or more features.

Figure 3:
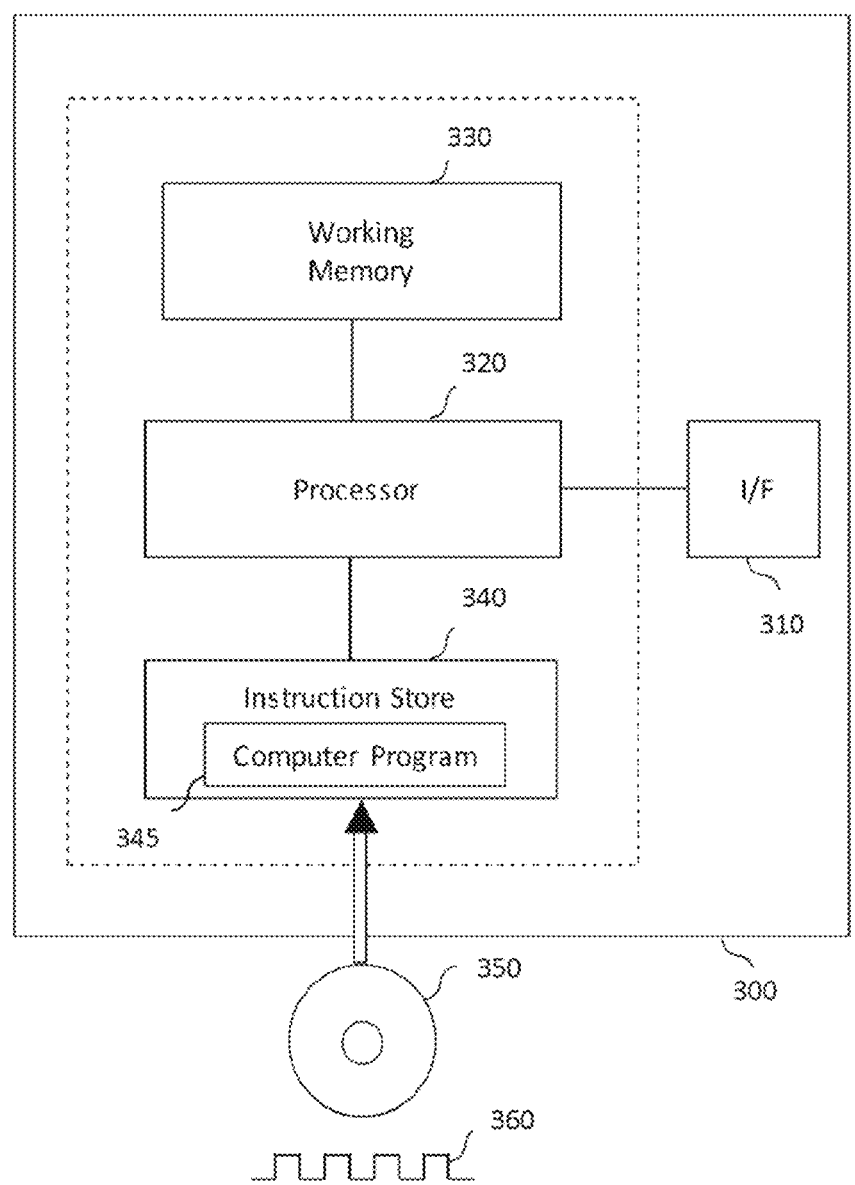
FIG. 3 is a schematic illustration of programmable signal processing apparatus, which may be configured to implement the functionality of the device of FIG. 1.

FIG. 3 is a schematic illustration of programmable signal processing apparatus 300, which may be configured to implement the functionality of the device 100 of FIG. 1.

The signal processing apparatus 300 has an interface module 310 providing means, e.g., one or more antennae or wired connections, for transmitting and receiving information. The signal processing apparatus 300 also has a processor 320, e.g., a CPU, for controlling the programmable signal processing apparatus 300 to perform the functions of the device 100, a working memory 330, e.g., a random-access memory, and an instruction store 340 storing a computer program 345 having computer-readable instructions which, when executed by the processor 320, cause the processor 320 to perform the functions of the device 100.

The instruction store 340 may include a ROM, e.g., in the form of an electrically-erasable programmable read-only memory (EEPROM) or flash memory, which is pre-loaded with the computer-readable instructions. Alternatively, the instruction store 340 may include a RAM or similar type of memory, and the computer-readable instructions can be input thereto from a computer program product, such as a computer-readable storage medium 350 such as a CD-ROM, etc. or a computer-readable signal 360 carrying the computer-readable instructions.

The device 100 may alternatively be implemented in non-programmable hardware, such as an application-specific integrated circuit (ASIC) or in any other suitable manner, using any suitable combination of hardware and software components.

As discussed above, the present disclosure provides various techniques to determine a height of an object in a surrounding of a vehicle 200 in a more-accurate and reliable manner.

Figure 4:
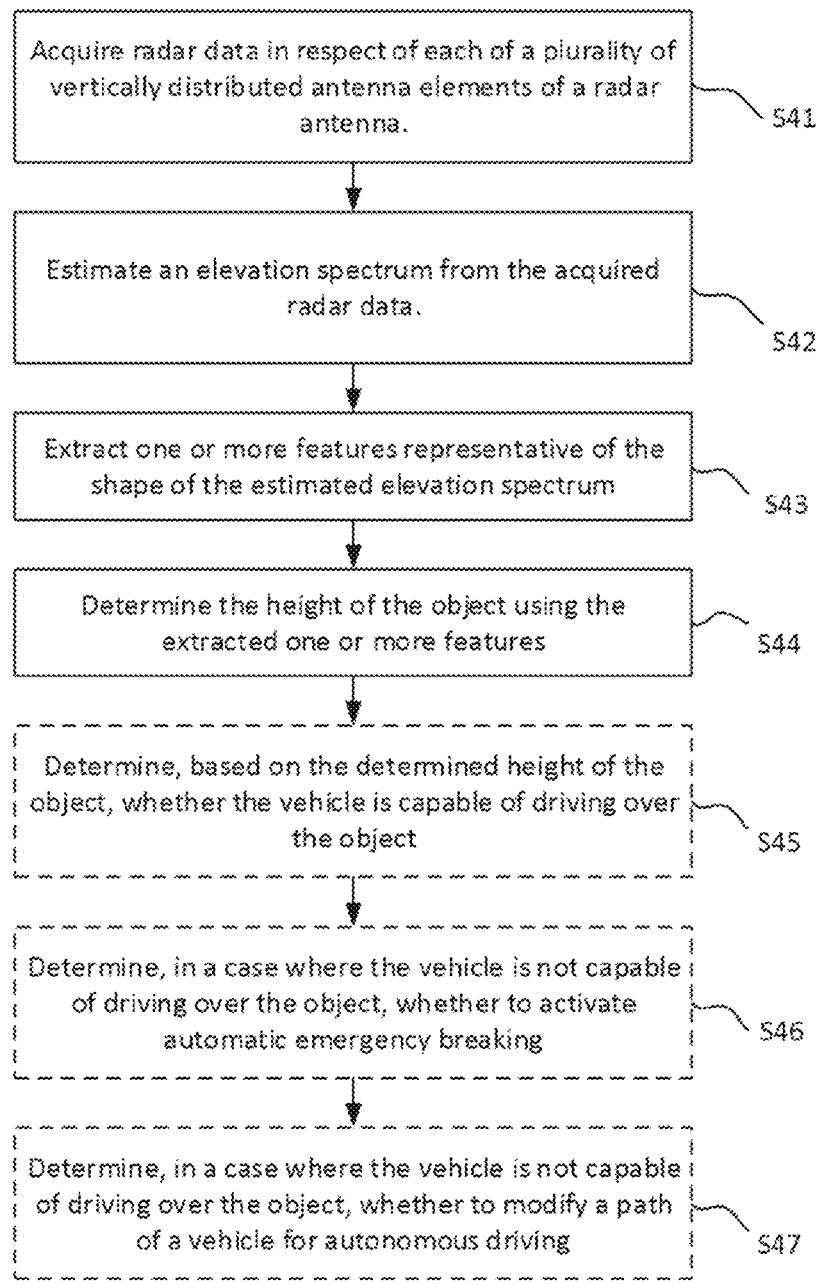
FIG. 4 is a flow diagram illustrating a process by which the device of FIG. 1 may determine a height of an object in the surrounding of a vehicle, in accordance with an example embodiment herein.

FIG. 4 is a flow diagram illustrating a process by which the device 100 of FIG. 1 may determine a height of an object in the surrounding of a vehicle 200, in accordance with an example embodiment herein.

In process step S41 of FIG. 4, the acquiring unit 120 acquires radar data in respect of each of a plurality of vertically distributed antenna elements of a radar antenna.

The acquiring unit 120 may, as in the present example embodiment, directly acquire the radar data from each of the plurality of vertically disturbed antenna elements of the antenna radar by any of the means discussed in relation to FIG. 1 above.

Alternatively, in example aspects in which the one or more radar sensors are provided separate to the device 100, the acquiring unit 120 may be configured to acquire the radar data in any suitable form and from any suitable entity. For example, the acquiring unit 120 may receive the radar data from a control unit of the radar sensor or other system that can directly acquire data output by the antenna elements, by any suitable wired or wireless communication means. By way of alternative, the acquiring unit 120 may read the radar data from an appropriate memory unit.

Optionally, the device 100 may, as in the present example embodiment, be configured to detect based on the acquired radar data whether an object is present in the surrounding of the vehicle 200 and to only perform subsequent steps of the process of FIG. 4 in a case where it is detected that an object is present in the surrounding of the vehicle 200. By way of example, this detection may be performed by the acquiring unit 120 or any other unit or module of the device 100.

By way of example, the device 100 may be configured to detect an object is present in the surrounding of the vehicle 200 in a case where any object other that the surface, e.g., the road, on which the vehicle 200 is traveling is detected using the acquired radar. This may, for example, allow the process of FIG. 4 to avoid repetitively calculating the height of the surface on which the vehicle is traveling.

For example, the device 100 may be configured to use the radar data to detect whether an object is present in the surrounding of the vehicle 200 by any suitable means known to those skilled in the art. By way of example, such a detection may be based on, for example, a delay between emitting the radar signal(s) and detecting the return signal(s), a frequency shift or a phase shift of the detected return signal(s) compared to the emitted radar signal(s), or a magnitude of the detected return signal(s).

Alternatively, the device 100 may be configured to proceed to subsequent steps of the process of FIG. 4 without the need for such a detection. As will be discussed below, the process of FIG. 4 may optionally include determining whether the vehicle is capable of driving over the object. This may also allow objects that do not hinder driving, such as the surface on which the vehicle 200 is travelling, to be determined not to be obstacles.

In process step S42 of FIG. 4, the estimating unit 130 estimates an elevation spectrum from the acquired radar data.

The elevation spectrum may, as in the present example embodiment, comprise an estimation of the phase or magnitude of a return signal versus elevation angle.

More specifically, as discussed above, the output of the plurality of vertically distributed antenna elements at a given time may be in the form of a so-called "beam vector" in which the respective return signal received at each antenna element is expressed as a complex number in the form of $z=Ae^{i\phi}$ where A is the magnitude of the electromagnetic field and $\phi$ is the phase of the electromagnetic field at that time.

That is, the beam vector is an n-dimensional vector, n being the number of the plurality of antenna elements, such that the output of the plurality of vertically distributed antenna elements, which is the acquired radar data, may, as in the present example embodiment, be a set of discrete values. For example, these may be in the form of complex numbers. As such, the estimating unit 130 may, as in the present example embodiment, be configured to use such discrete values to estimate an elevation spectrum that is continuous over a range of elevation angle corresponding to the vertical detection range of the device 100 as shown in FIG. 2B.

By way of example, the estimating unit 130 may, as in the present example embodiment, be configured to apply a decoder to the beam vector, which contains the single complex values from each antenna element. Alternatively, the estimating unit 130 may be configured to interpolate between the acquired radar data by any other suitable means known in the art.

In process step S43 of FIG. 4, the extracting unit 140 extracts one or more features representative of the shape of the estimated elevation spectrum.

The extracted one or more features are representative of the shape of the estimated elevation spectrum in that these one or more features do not merely specify a position of the peak of the elevation spectrum.

Instead, by way of non-limiting example, the extracted one or more features are indicative of or reflect at least one of: a value of magnitude and/or phase at one or more elevation positions, that is not just position information; a width of the elevation spectrum; a sharpness of a peak, for example tailedness; skew; a number of peaks of the elevation spectrum, etc. in order to represent the shape properties of the elevation spectrum.

The one or more features extracted by the extracting unit 140 depend on the approach for determining the height of the object used by the determining unit 150. In particular, the determining unit 150 may be configured to use a so-called "model-based approach" or a so-called "machine learning (ML)-based approach". As such, examples of the one or more features extracted by the extracting unit 140 and how such features may be extracted are discussed in more detail below in relation to these approaches.

In process step S44 of FIG. 4, the determining unit 150 determines the height of the object using the extracted one or more features.

As discussed above, the determining unit 150 may, as in the present example embodiment, be configured to use one of a model-based approach or a ML-based approach to determine the height of the object.

Model-Based Approach

The idea of the model-based approach is based on the following theoretical basis and experimental observations: real objects which occur on road surface often show multiple reflection points distributed vertically over the height of the object in question. As such, a functional dependency between the shape of the spectrum and the height of the object height may be established.

In a case where the distance between the device 100 and the object is large, the distribution of the elevation spectrum is similar with respect to low and high objects, e.g., objects having a relatively low height and objects having a relatively large height, respectively. However, while approaching the object with the device 100, high objects are expected to cover a broader area in the spectrum in comparison to low objects due to the given geometry.

In general, the core of the model-based approach relies on a minimization between a function, e.g., one which represents the given geometry, and the elevation spectrum, as will be described in relation to FIGS. 5A to 5C.

By way of example, the extracting unit 140 may, as in the present example embodiment, by configure to extract, as the extracted one or more features, an angular area $\theta$-3 dB (shown in FIG. 5B) of the elevation spectrum 500 at a given level of magnitude. The angular area $\theta$-3 dB of the elevation spectrum 500 at the given level of magnitude may also be referred to as an angular extent or an angular width.

For example, the given level of magnitude may be defined relative to the magnitude P the highest peak of the elevation spectrum 500, e.g., maximum magnitude. By way of example, in the example of FIG. 5B, the given level of magnitude is 3 dB below the magnitude P the highest peak of the elevation spectrum 500.

Figure 5A:
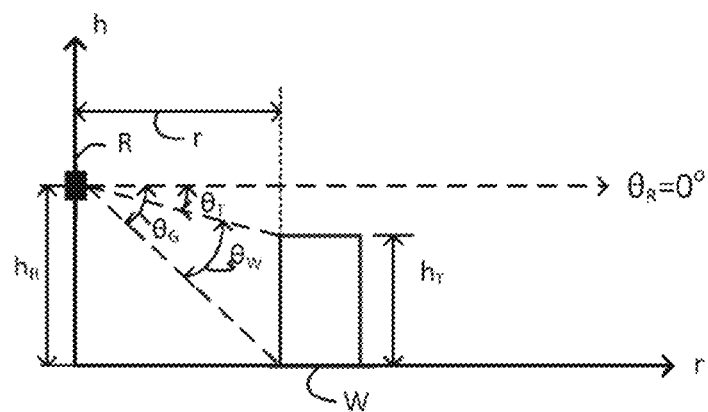
FIGS. 5A to 5C illustrate a model-based approach for determining the height of an object in the surrounding of a vehicle, in accordance with an example embodiment herein.
Figure 5B:
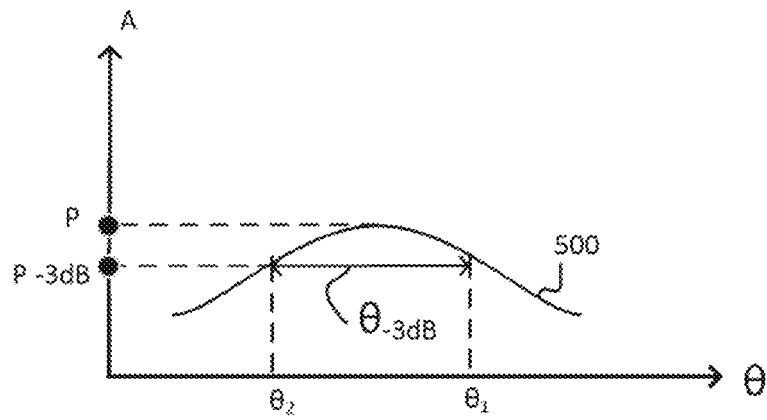

In such example embodiments, the extracting unit 140 may determine the angular area θ-3 dB as the width of the elevation spectrum at this given magnitude, i.e., as the difference between θ1 and θ2 in FIG. 5B.

In such example embodiments, the determining unit 150 may be configured to determine the height $h_T$ of the object W (shown in FIG. 5A) as a height value, that is a value of $h_T$, that minimizes a difference between the angular area $\theta_{-3}$ dB at the given level of magnitude relative to a highest peak of the elevation spectrum 500 and an estimated angular area $\theta_W$ of the object W.

In such example embodiments, the device 100 may, as in the present example embodiment, determine a distance r from the radar antenna R to the object W along the direct line of sight of the radar antenna R based on the radar data. For example, this may be achieved using conventional techniques for determining distance or range from radar data, as discussed above in relation to FIG. 1.

The estimated angular area $\theta_W$ of the object W may be estimated using the measured distance r from the radar antenna R to the object W, a mounting height $h_R$ of the radar antenna R relative to the ground and the height value.

By way of more specific example, angular area $\theta_W$ covered by the object W while approaching the object W with the device 100, i.e., the estimated angular area, can be expressed as follows:

Angle between top of the object $\theta_T$ and radar antenna $\theta_R=0°$ $$\sin\theta_T = \frac{h_R - h_T}{r}$$

Angle between ground $\theta_G$ and Radar $\theta_T=0°$ $$\sin\theta_G = \frac{h_R - 0}{r} = \frac{h_R}{r}$$

The estimated angular area $\theta_W$ may be calculated by the difference in angle between the top of the target, i.e., object W, and the ground, as follows:

$$\theta_W = \theta_G - \theta_T$$
$$\theta_W = \sin^{-1}\left(\frac{h_R}{r}\right) - \sin^{-1}\left(\frac{h_R - h_T}{r}\right)$$

The angular area $\theta_{-3}$ dB at the given level of magnitude relative to a highest peak of the elevation spectrum 500 may be defined as the width of the spectrum 500 at a defined magnitude level, e.g., −3 dB, relative to the magnitude P of the highest peak.

In order to estimate the height of the object W, the following minimization problem is solved:

$$\min/h_T[\theta_W(h_T,r,h_R) - \theta_{-3} \text{ dB}]$$

As such, the data which is fed into the optimization problem consists of the distance r between the radar antenna R and the object W and the measured spectrum width $\theta_{-3}$ dB. The measured spectrum width $\theta_{-3}$ dB is an example of an extracted feature representative of the shape of the estimated elevation spectrum.

In the example of FIGS. 5A and 5B, the given level of magnitude is 3 dB below the magnitude P the highest peak of the elevation spectrum 500. Alternatively, any other suitable level of magnitude may be used.

In the example of FIGS. 5A and 5B, the elevation angles are defined such that the angle of the radar antenna $\theta_R$ is equal of 0° and all other angles are defined relative thereto. Alternatively, the angles may be defined relative to any other suitable frame of reference and the above equations adapted accordingly.

By way of alternative, the extracting unit 140 may be configured to extract the one or more features by fitting a distribution of the elevation spectrum and extracting, as the one or more features, one or more parameters of the fitted distribution.

Any distribution may be used with which it is possible to meaningfully reflect the shape/spectrum extent of the elevation spectrum 500. In this case, the angular area $\theta_{-3}$ dB of the elevation spectrum 500 at the given level of magnitude shown in FIG. 5B may be replaced with any suitable parameter of the distribution that represents the extent/broadness of the elevation spectrum, e.g., a width of the fitted distribution or a given number of standard deviations or the variance parameter if the fitted distribution is a Gaussian distribution. However, the distribution used is not limited to a Gaussian distribution.

In such example embodiments, the determining unit 150 may be configured to determine the height $h_T$ of the object W (shown in FIG. 5A) as a height value, i.e., a value of $h_T$, that minimizes a difference between the parameter that represents the extent/broadness of the elevation spectrum 500 and the estimated angular area $\theta_W$ of the object W (calculated as discussed above).

As the device 100 and the radar antenna R approach the object W, the distance r to the object W decreases. As such, new data points are created, namely, new pairs of distance r and angular area $\theta_{-3}$ dB of the elevation spectrum 500 at the given level of magnitude or, in examples using a fitted distribution, a corresponding parameter from a fitted distribution.

As such, the process of FIG. 4 may, as in the present example embodiment, further comprise an optional step in which the determining unit 150 determines an updated height of the object based on radar data acquired for each of one or more time steps as the vehicle moves.

Figure 5C:
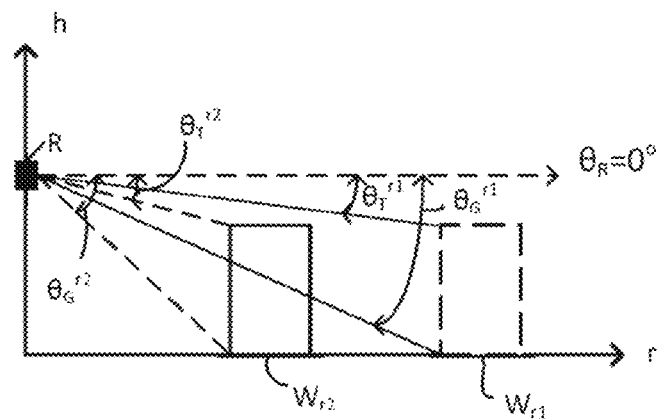

This is illustrated in FIG. 5C, which shows the angle between top of the object $\theta_T$ and radar antenna $\theta_R=0°$ and the angle between ground $\theta_G$ and Radar $\theta_T=0°$ for each of two positions, namely $r_1$ and $r_2$, relative to the radar antenna R.

The one or more time steps may also be referred to, for example, as time intervals. By way of example, such time steps may be based on a clocking scheme and may represent a set time interval between each updated determination of the height of the object.

ML-Based Approach

Recently, the exploration of machine learning for analyzing radar signals has attracted a lot of attention. Besides, machine learning techniques have shown outstanding results in the field of signal processing. An ML-based approach to determining the height of the object will be described in relation to FIGS. 6A to 6C.

In particular, the determining unit 150 may be configured to determine the height of the object by inputting the extracted one or more features to a machine learning algorithm.

Figure 6A:
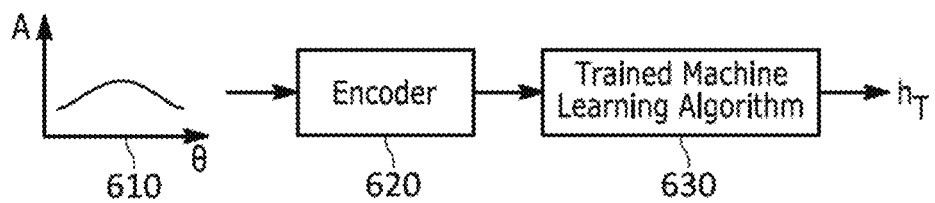
FIGS. 6A to 6C illustrate a machine learning-based approach for determining the height of an object in the surrounding of a vehicle, in accordance with an example embodiment herein.

By way of example, as shown in FIG. 6A, an elevation spectrum 610 estimated by the estimating unit 130 may be put into an encoder 620, which implements, at least in part, the extracting unit 140 in the present example, in order to extract one or more features representative of the shape of the estimated elevation spectrum 610.

The extracted one or more features representative of the shape of the estimated elevation spectrum 610 are output by the encoder 620 to a machine learning algorithm 630, which implements, at least in part, the determining unit 150 in the present example. The trained machine learning algorithm 630 may be configured to determine a relationship between the shape of an elevation spectrum 610 as represented by the extracted on or more features and a height of an object. As such, in response to receiving the extracted one or more features from the encoder 620, the machine learning algorithm 630 outputs a value of the height of the object to which the elevation spectrum 610 relates.

More generally, the machine learning algorithm 630 may trained to learn a relationship between the shape of an elevation spectrum 610 and a height of an object. By way of example, the machine learning algorithm 630 may be trained using a supervised machine learning technique, such as, for example, Support Vector Regression, Multi-Layer-Perceptron, Convolutional Neural Network with regression neuron, etc.

The advantage of supervised machine learning techniques is that they are capable of learning a mapping $f(x, \theta)=y$ with inputs x, outputs y and learnable parameters $\theta$ based on data and not based on a fully designed model. Given that, supervised machine learning techniques can define mappings on a very abstract, multidimensional way. The machine learning techniques proposed herein are capable of learning model dynamics implicitly and directly from the input data.

Figure 6B:
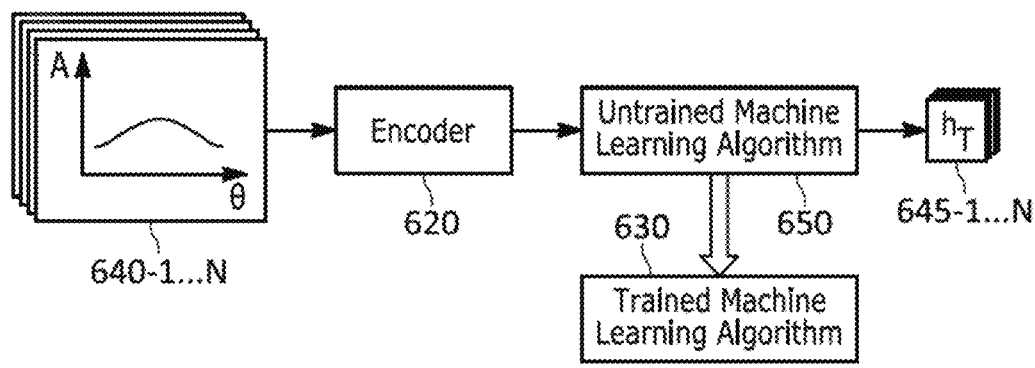

By way of example, machine learning algorithm 630 may be obtained by training an untrained machine learning algorithm 650 using first training data 640-1 . . . N and second training data 645-1 . . . N, as illustrated in FIG. 6B.

The first training data 640-1 . . . N comprises a plurality of elevation spectra and the second data 645-1 . . . N comprises an associated plurality of height values $h_T$, each height value in the second training data 645-1 . . . N corresponding to a respective one of the elevation spectra in the first training data 640-1 . . . N. Each height value in the second training data 645-1 . . . N serves as a label for the corresponding elevation spectrum in the first training data 640-1 . . . N and represents a desired output value that the trained machine learning algorithm 630 should output when one or more features representative of the shape of that elevation spectrum are received as an input to the trained machine learning algorithm 630.

The untrained machine learning algorithm 650 is configured to learn from and make predictions based on the training data so as to be able to accurately predict the height of the object from the extracted one or more features. In this way, the machine learning algorithm 630 that has learned the relationship between the shape of an elevation spectrum 610 and a height of an object is obtained.

Taking, by way of non-limiting example, a neural network as the untrained machine learning algorithm 650, it is noted that neural networks may automatically generate identifying characteristics by processing the input data, such as training data 640-1 . . . N and 645-1 . . . N, without any prior knowledge.

Neural networks have emerged in the past years as a state-of-the-art tool in many applications such as computer vision or natural language processing. Especially in computer vision the state-of-the-art object detectors are based on neural networks, in particular deep neural network and convolutional neural networks.

In general, a neural network consists of an input layer having one or more input nodes and an output layer having one or more output nodes, as well as multiple hidden layers. Each of the layers is composed of a plurality of artificial neurons, and each layer may perform different kinds of transformations on their inputs. Each artificial neuron may be connected to multiple artificial neurons in adjacent layers. The output of each artificial neuron is computed by some non-linear function of the sum of its inputs. Artificial neurons and the connections therebetween typically have respective weights which determine the strength of the signal at a given connection. These weights are adjusted as learning proceeds, thereby adjusting the output of the neural network. Signals travel from the first layer, e.g., the input layer, to the last layer, e.g., the output layer, and may traverse the layers multiple times.

However, the unlearned machine learning algorithm 650 of any of the above-mentioned supervised machine learning techniques may be trained to learn the relationship between the shape of an elevation spectrum 610 and a height of an object in a corresponding manner.

In the ML-based, the extracting unit 140 may be configured to extract the one or more features comprises using a machine learning-based encoder technique.

The machine-learning based encoder technique for feature extraction is based on auto-encoder networks, which is an example of an ML learning algorithm trained using unsupervised learning. By way of example, as illustrated in FIGS. 6A and 6B, the extracting unit 140 is implemented, at least in part, by encoder 620).

Figure 6C:
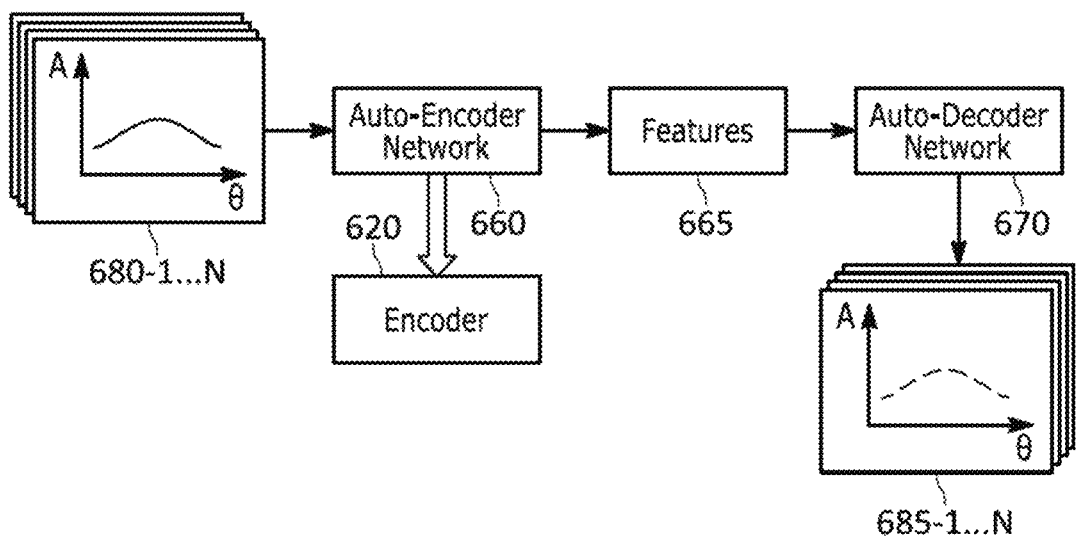

An example of how such encoder 620 may be obtained is described in relation to FIG. 6C.

The auto-encoder network 660 is trained using training data 680-1 . . . N comprising a plurality of elevation spectra. Training data 680-1 . . . N may be the same plurality of elevation spectra as first training data 640-1 . . . N. However, unlike the first training data 640-1 . . . N, the training data 680-1 . . . N does not require any label or other indication of desired output value as the auto-encoder network 660 is trained using unsupervised learning.

The auto-encoder network 660 is trained together with an auto-decoder network 670. The auto-encoder network 660 and the auto-decoder network 670 may be, for example, a convolutional neural net-based encoder-decoder network, a fully connect deep encoder-decoder neural network, a recurrent encoder-decoder neural network, etc.

The auto-encoder network 660 learns a representation, i.e., encoding, for the training data 680-1 . . . N, typically for dimensionality reduction, such that the encoding may be considered to generate features (indicated by features 665 (e.g., a reference sign) in FIG. 6C) of the elevation spectrum input as training data. Such features 665 may be considered as abstracted or hidden features, to distinguish from the features used in the model-based approach which are selected based on human expertise.

The encoding performed by the auto-encoder network 660 is validated and refined by attempting to regenerate or reconstruct by the auto-decoder network 670 an input elevation spectrum from the training data 680-1 . . . N from the encoding output by the auto-encoder network 660. As such, the training of the auto-encoder network 660 and the auto-decoder network 670 aims to minimize the reconstruction loss between the training data 680-1 . . . N input to the auto-encoder network 660 and the reconstructed data 685-1 . . . N output by the auto-decoder network 670.

Once training is completed, the trained auto-encoder network 660 is used as encoder 620 for feature extraction.

As illustrated in FIGS. 6A and 6B, in this case, the machine learning algorithm 630 will be trained to learn the relationship between one or more features representative of the shape of an elevation spectrum consisting of the encoding, e.g., features 665 in FIG. 6, output by the machine learning-based encoder technique and a height of the object.

Alternatively, in other example embodiments, rather than using an encoder 620 as shown in FIGS. 6A and 6B, any of the features based on human expertise discussed above in relation to the model-based approach may be used as input to the machine learning algorithm 630. The training of the machine learning algorithm 630 will otherwise be as described above in relation to FIGS. 6A and 6B.

By way of example, the extracted one or more features comprise at least one of: a width of the elevation spectrum at one or more levels of magnitude relative to a highest peak of the elevation spectrum; and one or more parameters of a distribution fitted to the elevation spectrum. The description of such features above in relation to the model-based approach applies equally to the ML-based approach.

In such example embodiments, the machine learning algorithm 630 will be trained to learn the relationship between one or more of the above-mentioned features representative of the shape of an elevation spectrum selected based on human expertise and a height of the object.

By way of further alternative, the machine learning algorithm may be trained using a combination of features output by an encoder and features selected based on human expertise.

In the example embodiment of FIGS. 6A to 6C, the extracting unit 140 and the determining unit 150 are implemented by separate means, namely the encoder 620 and/or corresponding means of extracting features selected based on human expertise and the machine learning algorithm 630, respectively. Alternatively, in some example embodiments, the functions of the extracting unit 140 and the determining unit 150 may be integrated.

In such example embodiments, the extracting unit 140 and the determining unit 150 may be implemented by a single machine learning algorithm that is trained both to extract one or more features representative of the shape of the estimated elevation spectrum and to determine the height of the object using the extracted one or more features in a single end-to-end training process. By way of example, such a machine learning algorithm may have convolutional layers to extract the features representative of the elevation spectrum and fully connected regression layer so that it may determine the height of the object.

That is, in such example embodiments, the machine learning algorithm may be configured to receive the elevation spectrum 610 estimated by the estimating unit 130 directly as input and may be trained to learn a relationship between the shape of an elevation spectrum received as input and a height of an object. Such a machine-learned algorithm may be trained using any of the supervised machine-learning techniques discussed above in relation to machine-learning algorithm 630.

Additionally, in some example embodiments, a position of a peak of the elevation spectrum may also be input to the machine learning algorithm 630. That is, the untrained machine learning algorithm 650 may also be trained using the position of a peak of the elevation spectrum as an input for each elevation spectrum in the training data 640-1 . . . N.

The radar data may be acquired for a plurality of timesteps $t_1, t_2, \ldots, t_N$, each timestep representing a so-called snapshot (i.e., full sensor data acquisition) of the environment of the vehicle at a respective current time. It is understood that the spatial environment of the vehicle may change due to a movement of the vehicle itself as well as due to the movement of non-stationary objects in the environment.

As noted above, in a case where the distance between the device 100 and the object is large, the distribution of the elevation spectrum is similar with respect to low and high objects (i.e., objects having a relatively low height and objects having a relatively large height). However, while approaching the object with the device 100, high objects are expected to cover a broader area in the spectrum in comparison to low objects due to the given geometry.

Figure 7A:
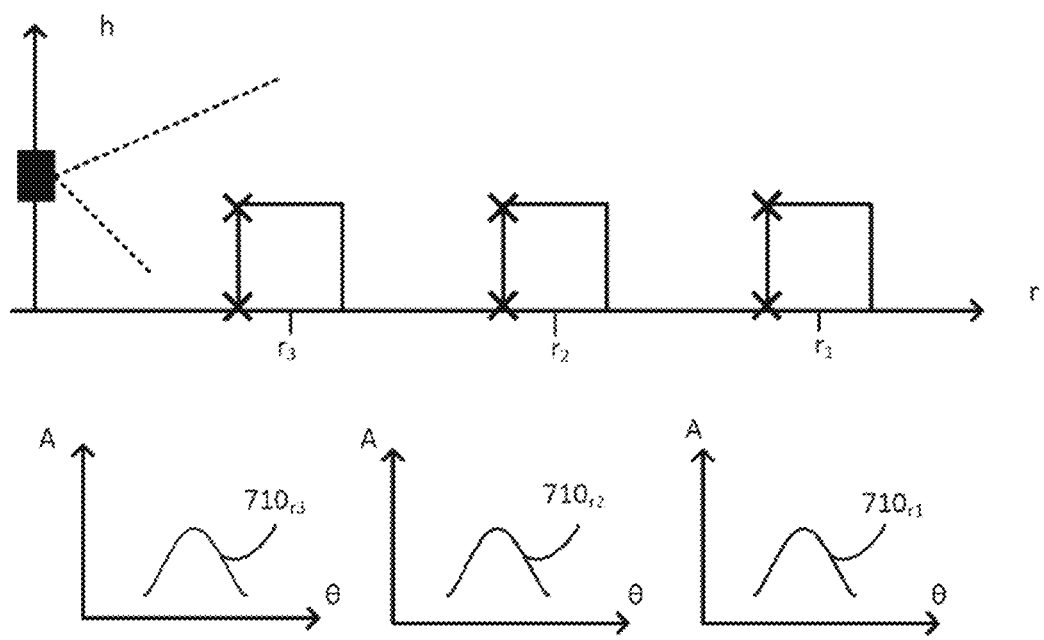
FIGS. 7A and 7B illustrate how the elevation spectra of objects of different heights vary over distance.
Figure 7B:
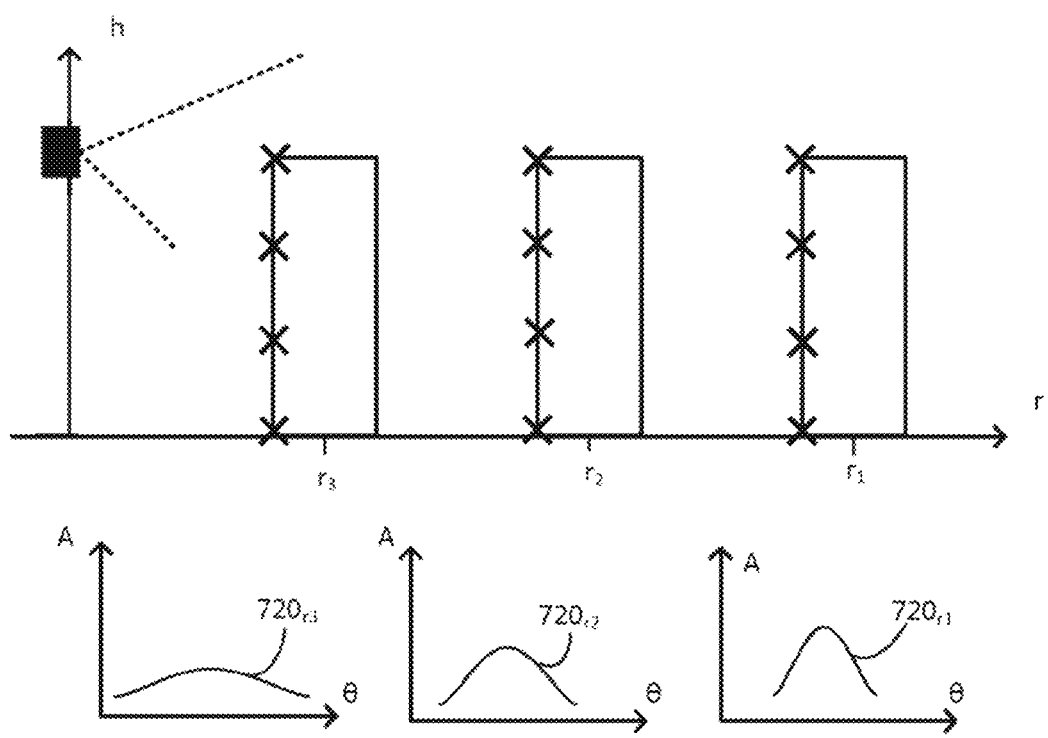

This is illustrated in FIGS. 7A and 7B. FIG. 7A illustrates the reflection points (indicated with an X) of a low object $W_L$ at each of three positions $r_1$, $r_2$, and $r_3$ relative the radar antenna R and the resulting estimated elevation spectra $710_{r1}$, $710_{r2}$, and $710_{r3}$, respectively. FIG. 7B illustrates the reflection points (indicated with an X) of a high object $W_H$ at each of three positions $r_1$, $r_2$, and $r_3$ relative the radar antenna R and the resulting estimated elevation spectra $720_{r1}$, $720_{r2}$, and $720_{r3}$, respectively.

As illustrated in FIGS. 7A and 7B, the elevation spectra $710_{r1}$ and $720_{r1}$ at the position $r_1$ furthest from the radar antenna R may be substantially identical. However, as the radar antenna R gets closer to objects $W_H$ and $W_L$, the resulting elevation spectra are increasingly different due to the given geometry of these objects. In particular, as the radar antenna R gets closer to objects $W_H$ and $W_L$, the resulting elevation spectra show increasing width and a lower peak value.

As such, how the elevation spectrum of a detected object changes over multiple time steps as the vehicle, on which the radar antenna R and device 100 are mounted, approaches the object may also be indicative of the height of the object and allow additional discriminative power to be obtained.

As such, in some example embodiments, the extracting unit 140 may be configured to extract the one or more features representative of the shape of the estimated elevation spectrum are extracted for radar data acquired for each of one or more time steps as the vehicle moves. The determining unit 150 may be configured to determine the height of the object by inputting, to the machine learning algorithm, the one or more features extracted for each of the one or more time steps.

By way of example, such temporal accumulation, i.e., considering multiple spectra, may be achieved by any of the following approaches:

Establish temporal accumulation by a histogram taking into account the generated features over range/time.

Establish temporal accumulation/dependency by using a 2D image-like representation of the elevation over range, e.g., elevation-range maps.

Use a recurrent machine learning technique to represent the temporal dependencies.

Additionally, in some example embodiments, the process of FIG. 4 according to the ML-based approach may further comprise an optional step in which the determining unit 150 determines an updated height of the object based on radar data acquired for each of one or more time steps as the vehicle moves.

In example embodiments in which the height of the object is determined by inputting, to the machine learning algorithm, the one or more features extracted for each of one or more time steps, the determining unit 150 may, for example, be configured to determine an updated height of the object based on radar data acquired for non-overlapping sets of one or more subsequent time steps. Alternatively, the set of time steps, for which an updated height of the object is determined, may be changed on a rolling basis. By way of example, the set of time steps may be generated by replacing the radar data of the oldest time step with the radar data of the most recent time step.

Returning to FIG. 4, the process of FIG. 4 may, as in the present example embodiment, additionally include optional process step S45. In optional process step S45 of FIG. 4, the determining unit 150 determines, based on the determined height of the object, whether the vehicle is capable of driving over the object.

By way of example, the determining unit 150 may be configured to determine that the vehicle 200 can safely drive over an object where the height of the object relative to the road surface does not exceed a particular threshold value. The threshold value may be dependent on the speed of the vehicle as it approaches the object and also depends on known, pre-stored characteristics of the vehicle, such as wheel size and road height/ground clearance. For example, the speed of the vehicle as it approaches the object obtainable from, for example, onboard sensors of the vehicle.

In example embodiments such as the present example embodiment, in which the process of FIG. 4 includes optional process step S45, the process of FIG. 4 may additionally include optional process step S46. In optional process step S46 of FIG. 4, the determining unit 150 determines, in a case where the vehicle is not capable of driving over the object, whether to activate automatic emergency breaking (AEB).

For example, AEB may be activated only if it is not possible to drive over the object. Alternatively, AEB may be activated only if it is not possible to drive over the object and if the object is in the path of the vehicle and/or within a certain distance of the vehicle.

By way of further example, the determination whether to activate AEB may also depend on the location of the object relative to the vehicle, the direction of travel of the vehicle, the speed of the vehicle as it approaches the object, and/or its acceleration, each which may be obtainable from, for example, onboard sensors of the vehicle.

Additionally, or alternatively, in example embodiments such as the present example embodiment, in which the process of FIG. 4 includes optional process step S45, the process of FIG. 4 may additionally include optional process step S47. In optional process step S47 of FIG. 4, the determining unit 150 determines, in a case where the vehicle is not capable of driving over the object, whether to modify a path of the vehicle for autonomous driving.

By way of example, the path of the vehicle may be modified, if it is not possible to drive over the object, or it may remain as it is if the object is over-drivable.

By way of further example, process step S47 may be included in the process of FIG. 4 in a case wherein the device 100 is provided as part of or interacts with a driver assistance system of the vehicle 200 having ADAS functionality or autonomous driving functionality. In a case where the driver assistance system has advanced driver-assistance system (ADAS) functionality or autonomous driving functionality, the driver assistance system may allow the driver of a host vehicle, e.g., the vehicle to be controlled, to hand over the control of both acceleration and steering of the vehicle to an autonomous driving system, which may be provided with, for example, a target velocity and headway time or more detailed information so as to follow an intended route. In this case, the intended route of the vehicle may be modified, if it is not possible to drive over the object, or it may remain as it is if the object is over-drivable. The intended route may also be referred to as a path.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the above described example embodiments are not limiting.

Further, the purpose of the Abstract is to enable the Patent Office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the embodiments presented herein in any way. It is also to be understood that any procedures recited in the claims need not be performed in the order presented.

While this specification contains many specific embodiment details, these should not be construed as limitations on the scope of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

The use of "example," "advantageous," and grammatically related terms means "serving as an example, instance, or illustration," and not "preferred" or "advantageous over other examples." Items represented in the accompanying figures and terms discussed herein may be indicative of one or more items or terms, and thus reference may be made interchangeably to single or plural forms of the items and terms in this written description. The use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"), unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

What is claimed is:

1. A method for determining a height ($h_T$) of an object (W) in a surrounding of a vehicle, the method comprising:
    acquiring, with at least one processor, radar data for each of a plurality of vertically distributed antenna elements of a radar antenna (R);
    estimating, with the at least one processor and from the acquired radar data, an elevation spectrum, the elevation spectrum comprising an estimation of the magnitude of a return signal versus elevation angle and a shape of the elevation spectrum representing a reflection behavior of the object (W);
    extracting, with the at least one processor, one or more features representative of the shape of the estimated elevation spectrum, the one or more features comprising an angular area of the elevation spectrum at a given level of magnitude; and
    determining, with the at least one processor, the height ($h_T$) of the object (W) using the extracted one or more features.

2. The method of claim 1, further comprising determining, with the at least one processor, a distance (r) from the radar antenna (R) to the object (W) based on the radar data, and wherein:
    an estimated angular area of the object (W) for a given height value is estimated using the measured distance (r) from the radar antenna (R) to the object (W), a mounting height ($h_R$) of the radar antenna (R) relative to the ground, and the given height value; and
    the height ($h_T$) of the object (W) is determined as a height value that minimizes a difference between the angular area at the given level of magnitude relative to a highest peak of the elevation spectrum and an estimated angular area of the object (W).

3. The method of claim 1, wherein extracting the one or more features comprises fitting, with the at least one processor, a distribution of the elevation spectrum and extracting, as the one or more features, one or more parameters of the fitted distribution.

4. The method of claim 1, further comprising:
determining, with the at least one processor, an updated height ($h_T$) of the object (W) based on radar data acquired for each of one or more time steps as the vehicle moves.

5. The method of claim 1, wherein the height ($h_T$) of the object (W) is determined by inputting, with the at least one processor, the extracted one or more features to a machine learning algorithm.

6. The method of claim 5, wherein:
the one or more features representative of the shape of the estimated elevation spectrum are extracted for radar data acquired for each of one or more time steps as the vehicle moves; and
the height ($h_T$) of the object (W) is determined by inputting, to the machine learning algorithm, the one or more features extracted for each of the one or more time steps.

7. The method of claim 5, wherein the extracted one or more features comprise at least one of:
a width of the elevation spectrum at one or more levels of magnitude relative to a highest peak of the elevation spectrum; and
one or more parameters of a distribution fitted to the elevation spectrum.

8. The method of claim 5, wherein extracting the one or more features comprises using a machine learning-based encoder technique.

9. The method of claim 1, further comprising:
determining, with the at least one processor and based on the determined height ($h_T$) of the object (W), whether the vehicle is capable of driving over the object (W).

10. The computer-implemented method of claim 9, further comprising at least one of:
determining, with the at least one processor and in a case where the vehicle is not capable of driving over the object (W), whether to activate automatic emergency breaking; or
determining, with the at least one processor and in a case where the vehicle is not capable of driving over the object (W), whether to modify a path of the vehicle for autonomous driving.

11. A non-transitory computer-readable medium storing instructions which, when the program is executed by a at least one processor, cause the at least one processor to:
acquire radar data for each of a plurality of vertically distributed antenna elements of a radar antenna (R);
estimate, from the acquired radar data, an elevation spectrum, the elevation spectrum comprising an estimation of the magnitude of a return signal versus elevation angle and a shape of the elevation spectrum representing a reflection behavior of an object (W) in a surrounding of a vehicle;
extract one or more features representative of the shape of the estimated elevation spectrum, the one or more features comprising an angular area of the elevation spectrum at a given level of magnitude; and
determine the height ($h_T$) of the object (W) using the extracted one or more features.

12. The non-transitory computer-readable medium of claim 11, wherein the instructions, when executed by the at least one processor, further cause the at least one processor to:
determine a distance (r) from the radar antenna (R) to the object (W) based on the radar data, and wherein:
an estimated angular area of the object (W) for a given height value is estimated using the measured distance (r) from the radar antenna (R) to the object (W), a mounting height ($h_R$) of the radar antenna (R) relative to the ground, and the given height value; and
the height ($h_T$) of the object (W) is determined as a height value that minimizes a difference between the angular area at the given level of magnitude relative to a highest peak of the elevation spectrum and an estimated angular area of the object (W).

13. The non-transitory computer-readable medium of claim 11, wherein the extraction of the one or more features comprises fitting a distribution of the elevation spectrum and extracting, as the one or more features, one or more parameters of the fitted distribution.

14. The non-transitory computer-readable medium of claim 11, wherein the instructions, when executed by the at least one processor, further cause the at least one processor to:
determine an updated height ($h_T$) of the object (W) based on radar data acquired for each of one or more time steps as the vehicle moves.

15. The non-transitory computer-readable medium of claim 11, wherein:
the height ($h_T$) of the object (W) is determined by inputting the extracted one or more features to a machine-learning algorithm.

16. The non-transitory computer-readable medium of claim 15, wherein:
the one or more features representative of the shape of the estimated elevation spectrum are extracted for radar data acquired for each of one or more time steps as the vehicle moves; and
the height ($h_T$) of the object (W) is determined by inputting, to the machine learning algorithm, the one or more features extracted for each of the one or more time steps.

17. A system for determining a height ($h_T$) of an object (W) in a surrounding of a vehicle, the system comprising:
at least one processor;
a non-transitory computer-readable medium storing instructions which, when executed by the at least one processor, cause the at least one processor to:
acquire radar data for each of a plurality of vertically distributed antenna elements of a radar antenna (R);
estimate, from the acquired radar data, an elevation spectrum, the elevation spectrum comprising an estimation of the magnitude of a return signal versus elevation angle and a shape of the elevation spectrum representing a reflection behavior of the object (W);
extract one or more features representative of the shape of the estimated elevation spectrum, the one or more features comprising an angular area of the elevation spectrum at a given level of magnitude; and
determine the height ($h_T$) of the object (W) using the extracted one or more features.

18. The system of claim 17, further comprising:
one or more radar antennas (R), each of the one or more radar antennas (R) comprising a plurality of vertically distributed antenna elements.

19. The system of claim 17, wherein the system is integrated within the vehicle.

20. The system of claim 17, wherein the system further comprises the vehicle.

\* \* \* \* \*